United States Patent [19]

Anthony

[11] 3,785,416
[45] Jan. 15, 1974

[54] LUMBER PLANER AND CROOK ELIMINATOR

[76] Inventor: Luther Clary Anthony, 900 Machen P.O. Box 794, Springhill, La. 71075

[22] Filed: July 31, 1972

[21] Appl. No.: 276,900

[52] U.S. Cl............ 144/116, 144/128, 144/242 R, 144/245 A, 198/167
[51] Int. Cl. ............................................ B27c 1/12
[58] Field of Search.............. 198/167; 144/114 R, 144/114 A, 116, 121, 122, 128, 134, 134 A, 242 R, 242 C, 242 D, 245 R, 245 A, 246 R, 246 A, 249 R

[56] References Cited
UNITED STATES PATENTS

| | | | |
|---|---|---|---|
| 2,985,205 | 5/1961 | Mann | 144/116 |
| 1,907,479 | 5/1933 | Bendix | 144/245 A |
| 2,552,367 | 5/1951 | Carlson | 144/128 |
| 1,805,906 | 5/1931 | Dennis | 144/242 R X |
| 2,696,856 | 12/1954 | McCoy | 144/116 |
| 2,309,417 | 1/1943 | Sapp | 144/116 |
| 2,387,446 | 10/1945 | Herz | 144/245 A X |

FOREIGN PATENTS OR APPLICATIONS

| | | | |
|---|---|---|---|
| 1,020,571 | 2/1966 | Great Britain | 144/116 |

Primary Examiner—Andrew R. Juhasz
Assistant Examiner—W. D. Bray
Attorney—Cameron, Kerkam, Sutton, Stowell & Stowell

[57] ABSTRACT

A machine for producing straight lumber from stock including crooked pieces is provided and includes a pair of laterally spaced cutters which simultaneously plane the edges of the stock lumber after the stock has been fed in a straight line with no lateral movement or squiggle into the cutter heads. The stock lumber is fed by a combination of an endless gripper chain having an active run in a grooved table and a plurality of pressure rolls which hold the lumber stock on a top surface of the gripper chain.

13 Claims, 24 Drawing Figures

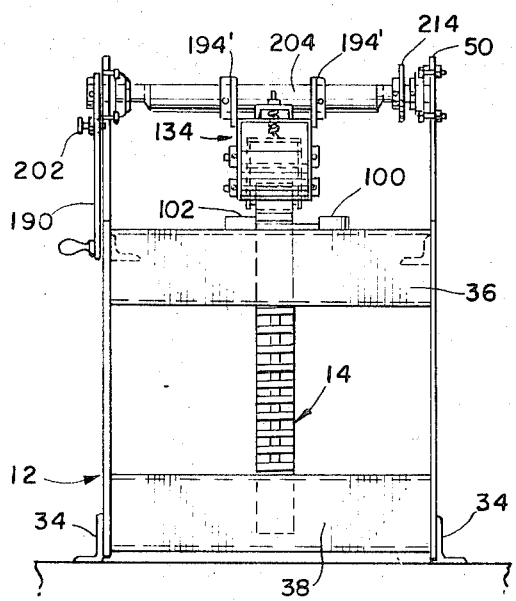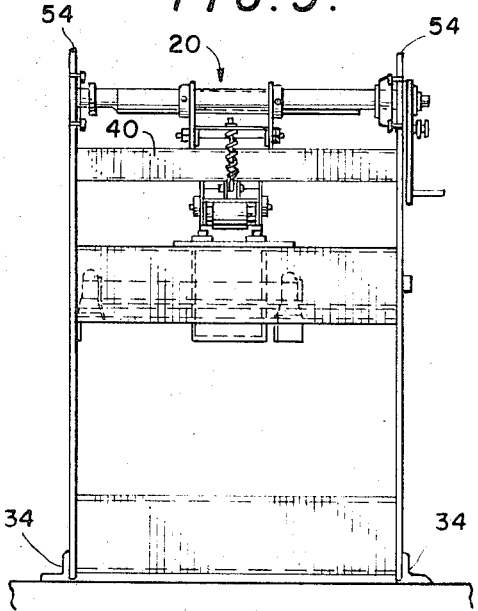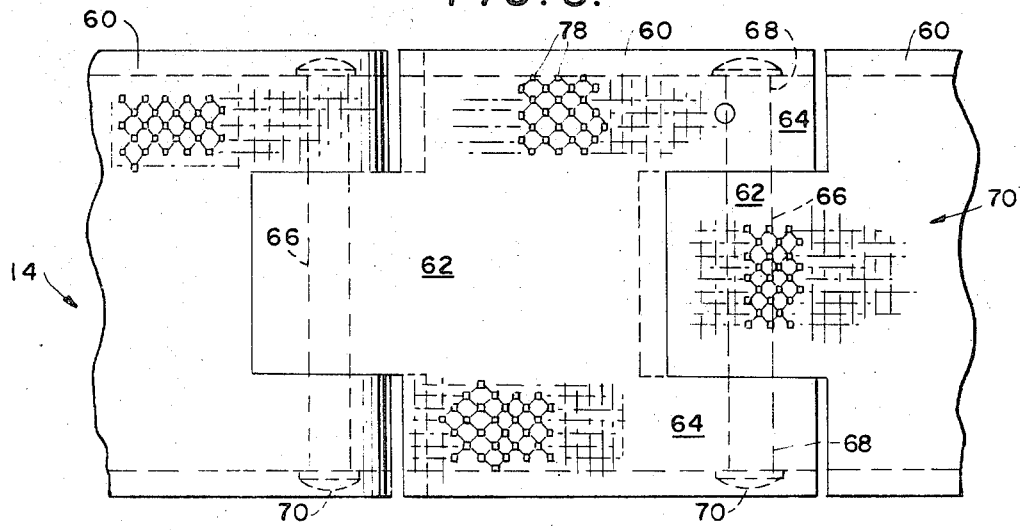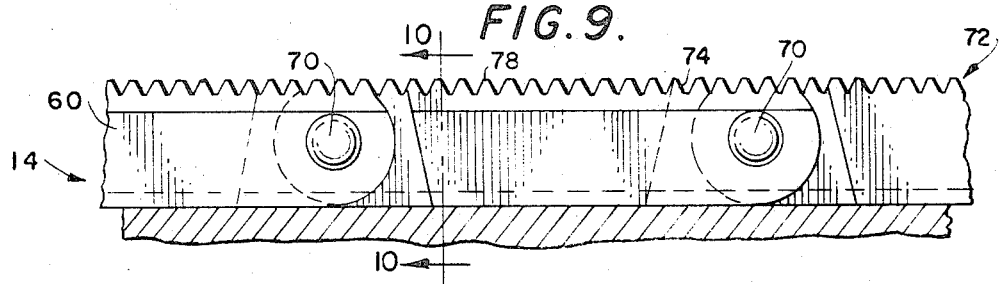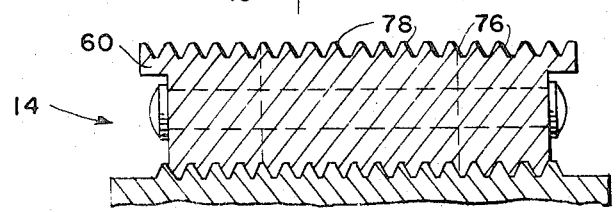

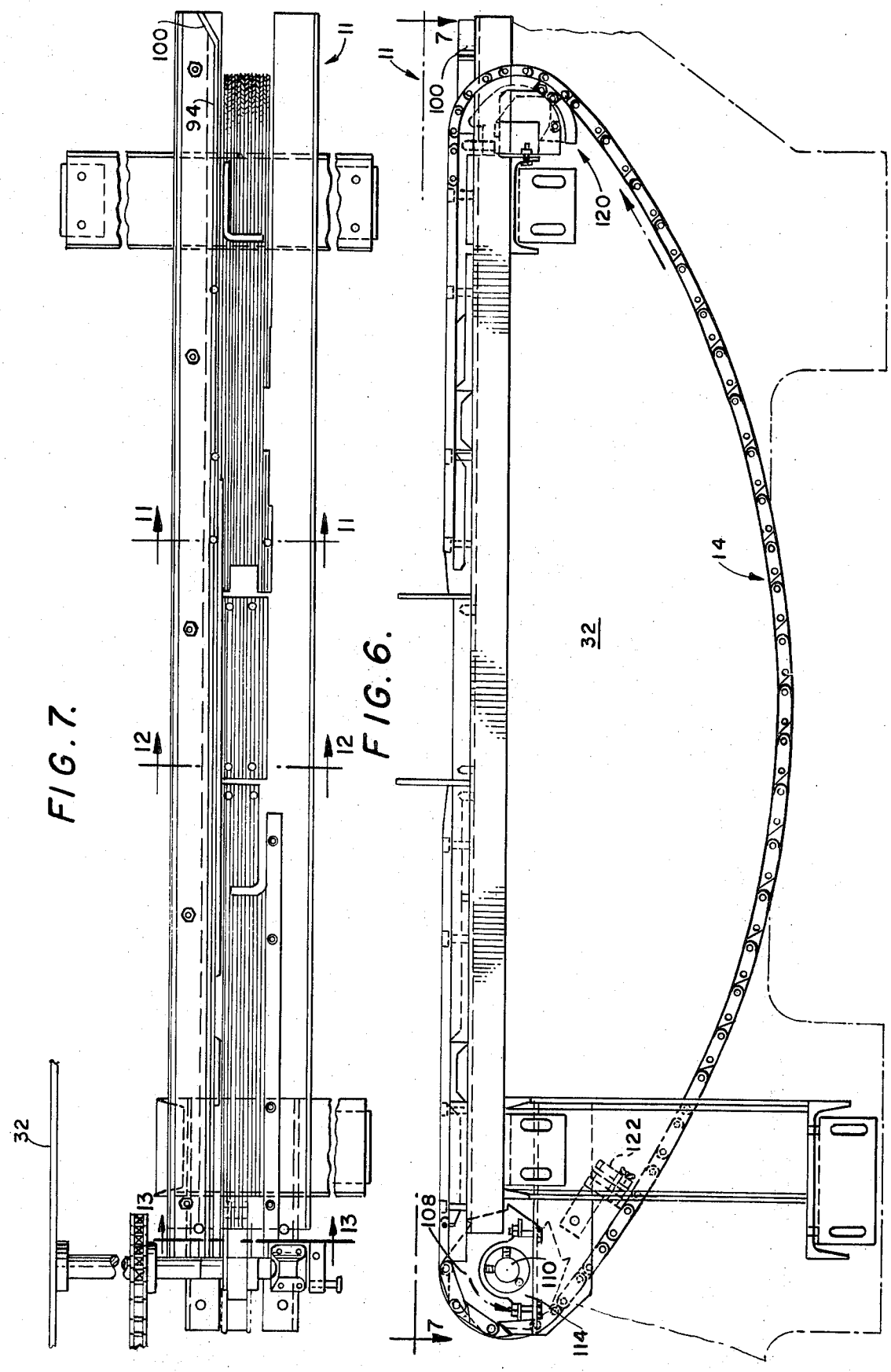

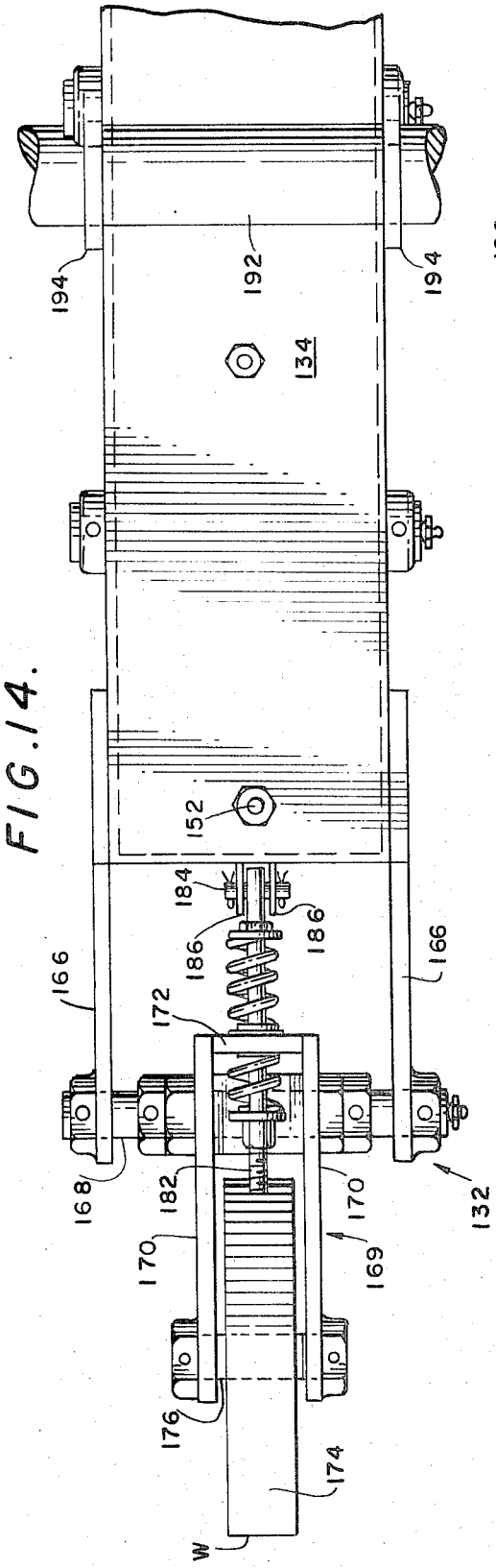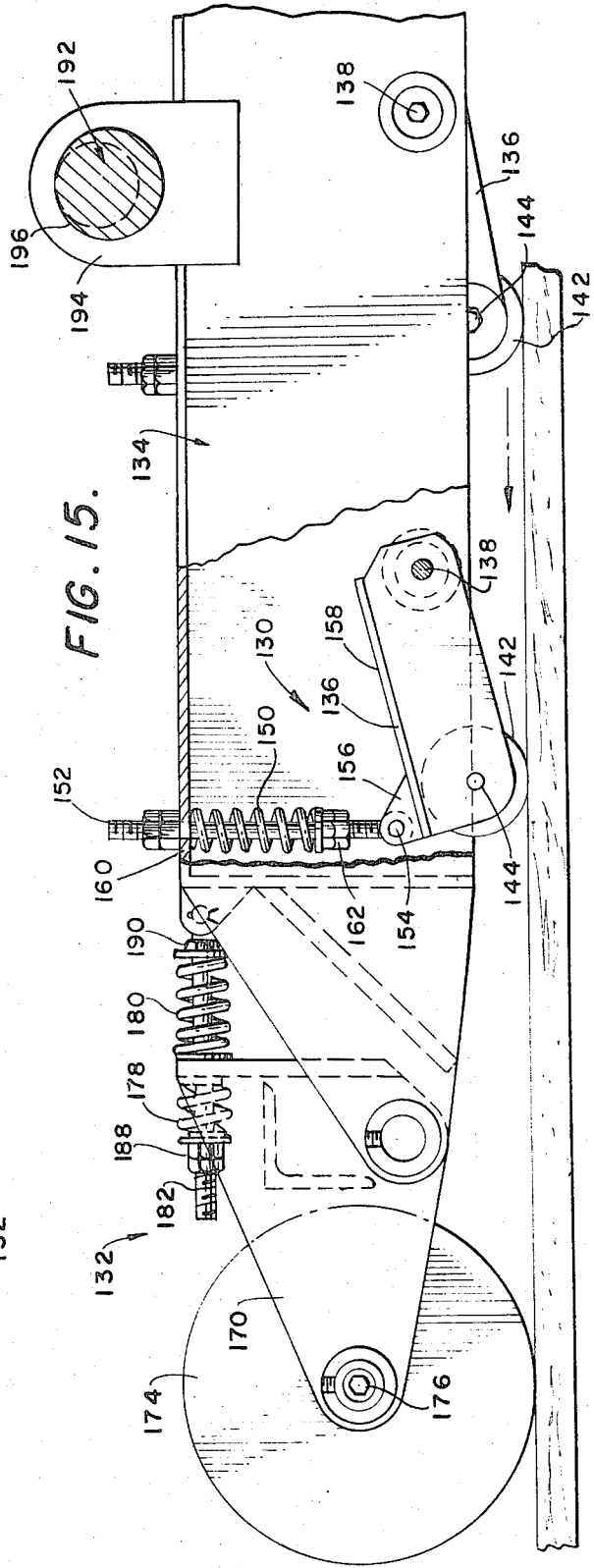

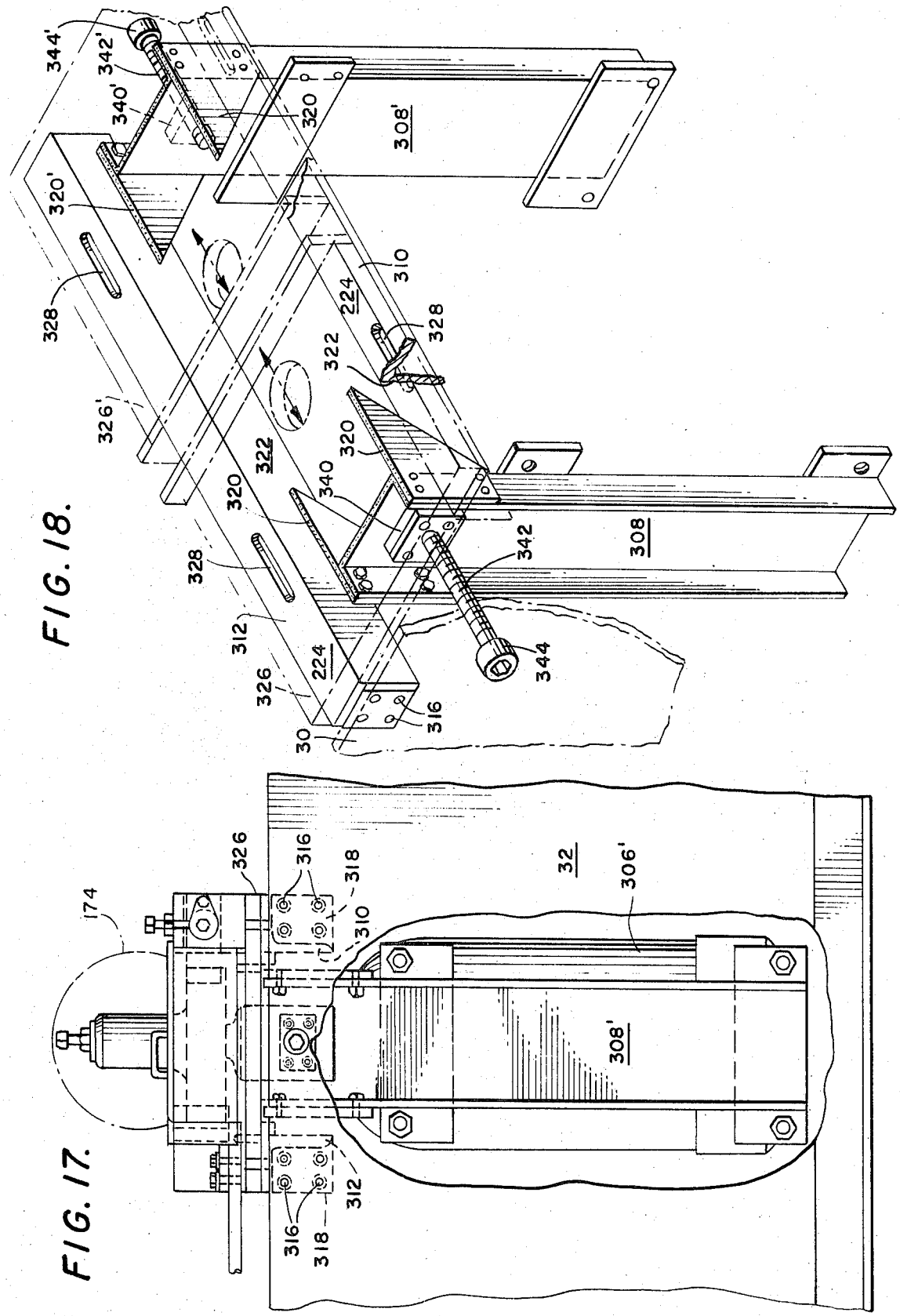

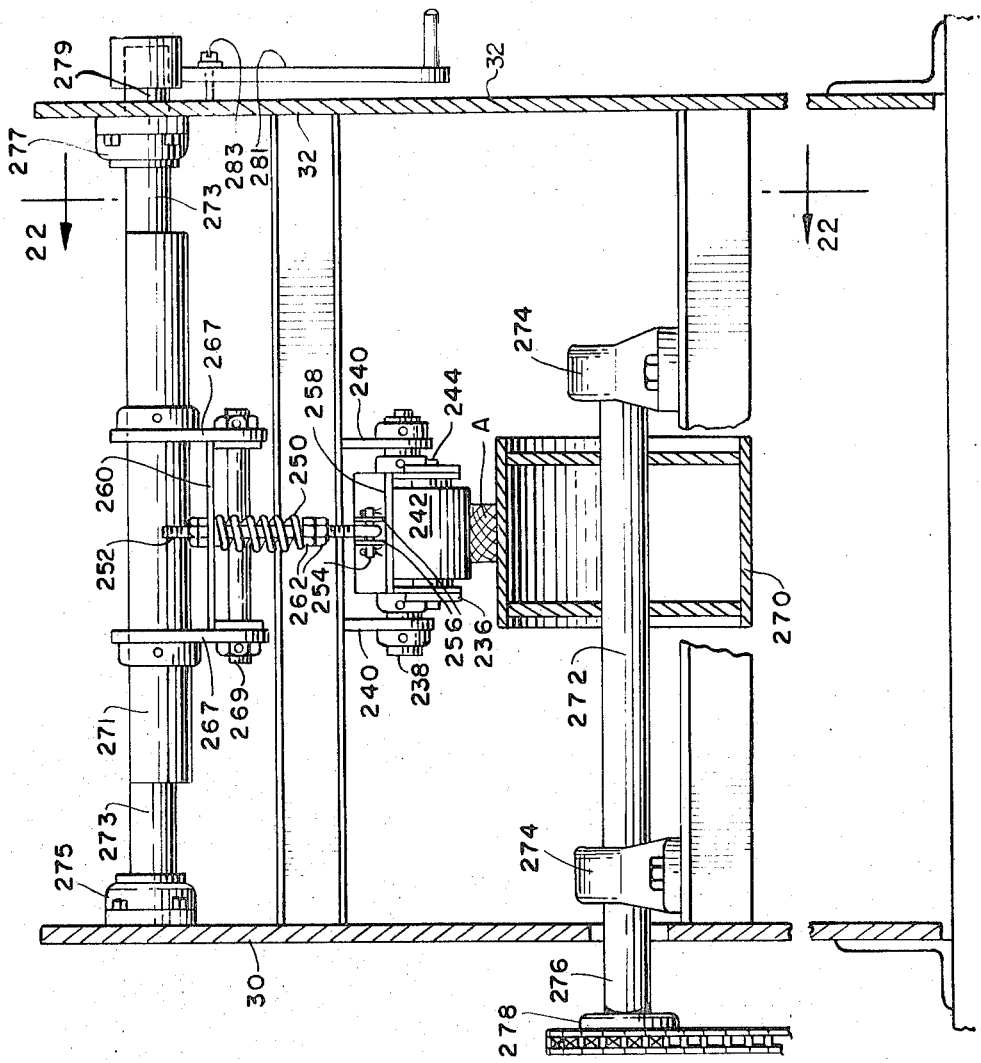
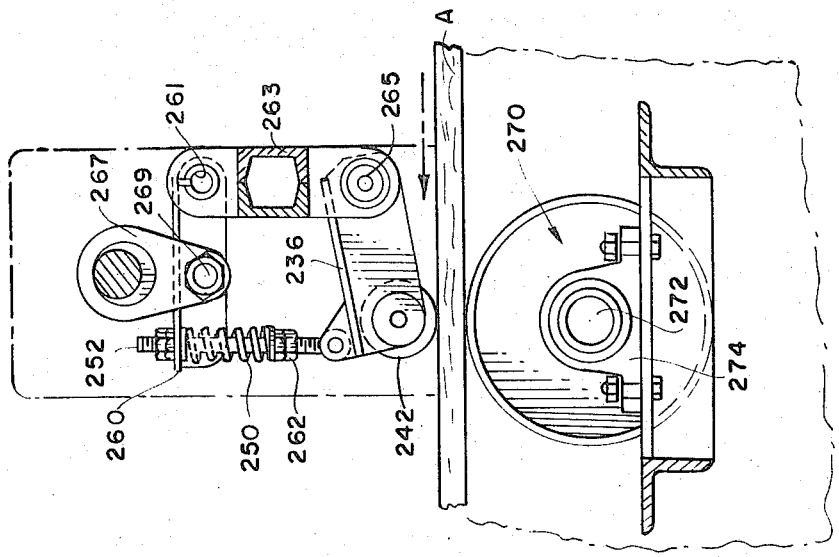

LUMBER PLANER AND CROOK ELIMINATOR

This invention relates generally to apparatus or a machine for planing the edges of stock lumber to produce straight lumber from pieces that have up to and including as much as, for example, one-half inch crook in an 8 foot long piece to produce straight, for example, 1-½ inch × 3-½ inch × 8 foot studs from normal stock 1-½ inch × 4-½ inch by 8 foot.

It is a further object of the present invention to provide such a machine that will handle stock lumber of varying lengths and in a continuous manner to thereby lend itself to working with automatic feed tables or to such a machine that may be placed ahead of a double surfacer to produce four-sided straight lumber.

It is a further object of the present invention to provide such a machine wherein a plurality of pressure rolls serve to hold the lumber onto an endless feed chain and the rolls are so arranged that individual pressure is applied by selective adjustment of each roll whereby as the lumber enters the machine it encounters only light pressure to allow easy entrance and as the lumber passes from roll to roll encounters greater pressure with the greatest pressure being on the last hold down roll before the lumber passes between the cutter heads.

It is a further object of the present invention to provide such a machine wherein dual cutters simultaneously remove excess lumber from opposite edges thereof to thereby reduce lateral displacement of the lumber often caused by the use of single cutter heads or by staggered cutter heads.

It is a further object of the present invention to provide such a machine which while having individually adjusted hold-down rollers has means for raising all of the pressure rollers simultaneously for the quick removal of jammed pieces or other stoppages of operation.

A further object is to provide such a machine including a particularly novel endless conveyor chain for the lumber to be planed with the conveyor chain having longitudinal grooves in its under surface which mate with top surface grooves in the machine's table thereby preventing lateral movement of the lumber engaged by the conveyor chain.

It is a further object to provide such a conveyor chain assembly wherein cam-like surfaces are employed to assist and ease the returning chain onto the grooved table.

Many other objects and advantages of the present invention will become apparent to those skilled in the art from the following description of the present invention when considered in light of the illustrated embodiment thereof shown in the accompanying drawings wherein:

FIG. 4 is a feed-end view of the improved planer;

FIG. 5 is the output end of the machine;

FIG. 6 is an enlarged fragmentary view of the conveyor chain for the apparatus;

FIG. 7 is a section substantially on line 7—7 of FIG. 6;

FIG. 8 is an enlarged fragmentary partial sectional view of a portion of the conveyor chain;

FIG. 9 is an end elevational view of the portion of the chain shown in FIG. 8;

FIG. 10 is a section substantially on line 10—10 of FIG. 9;

Figure 3:
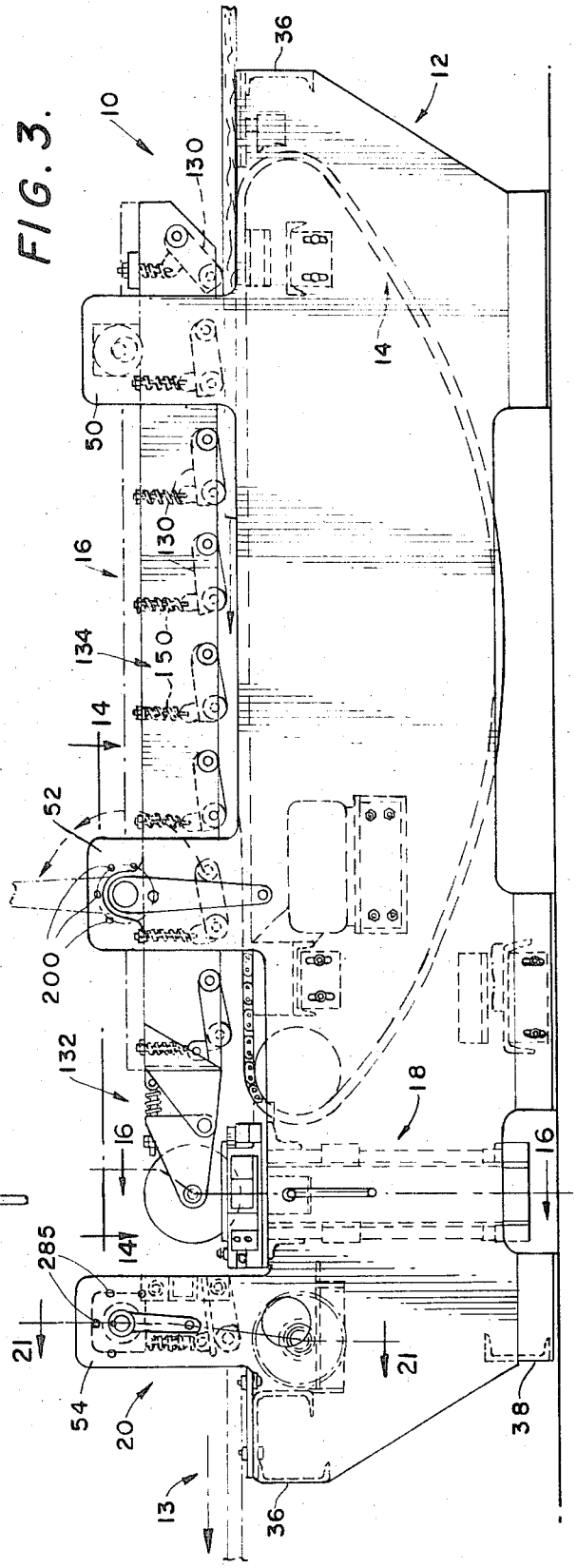
FIG. 3 is a left-side elevational view of the apparatus shown in FIGS. 1 and 2 with certain of the mechanisms thereof shown in phantom lines.
Figure 23:
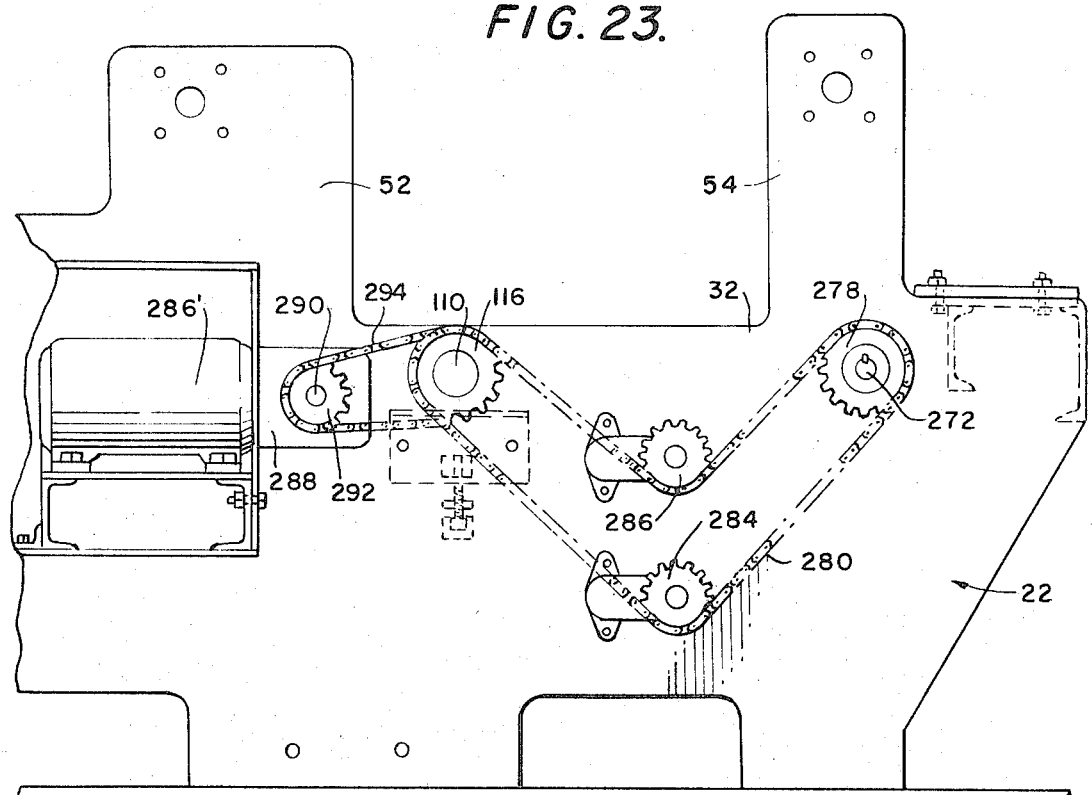
Figure 11:
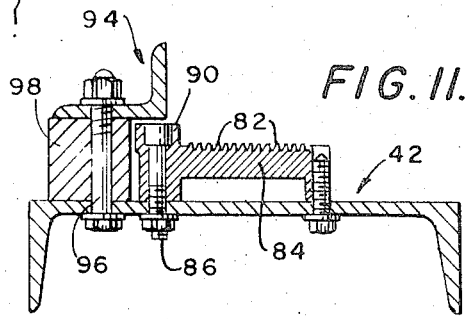
Figure 12:
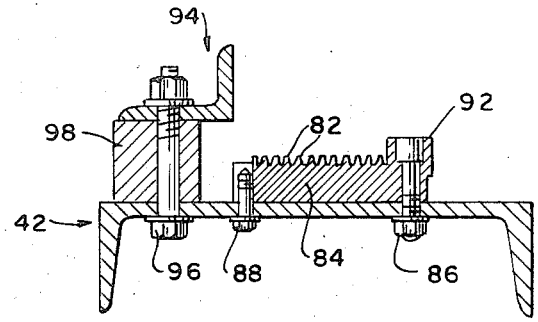
Figure 13:
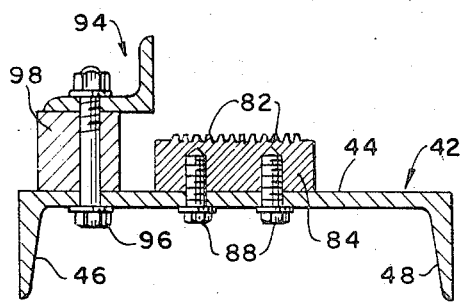
Figure 16:
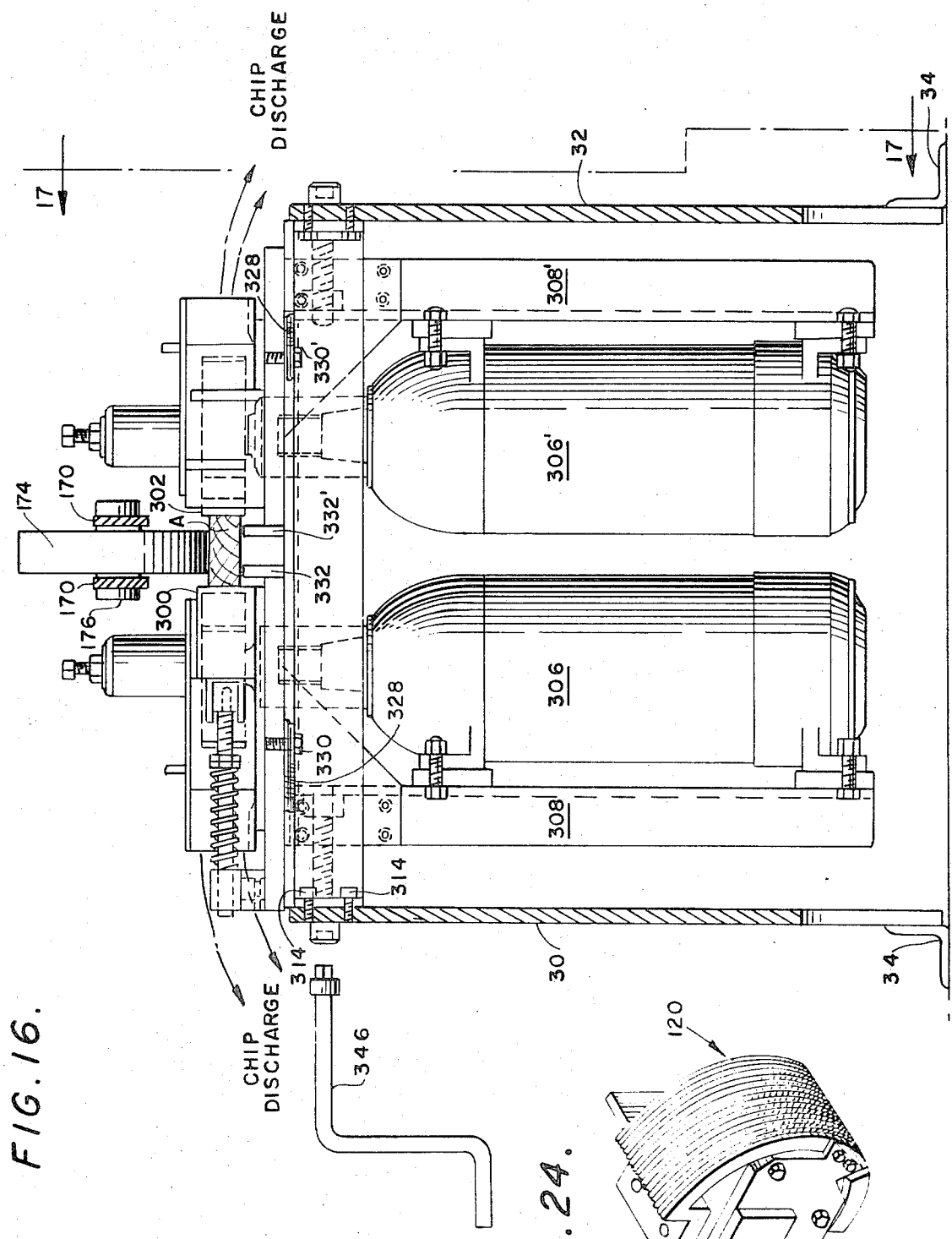
Figure 24:
Figure 19:
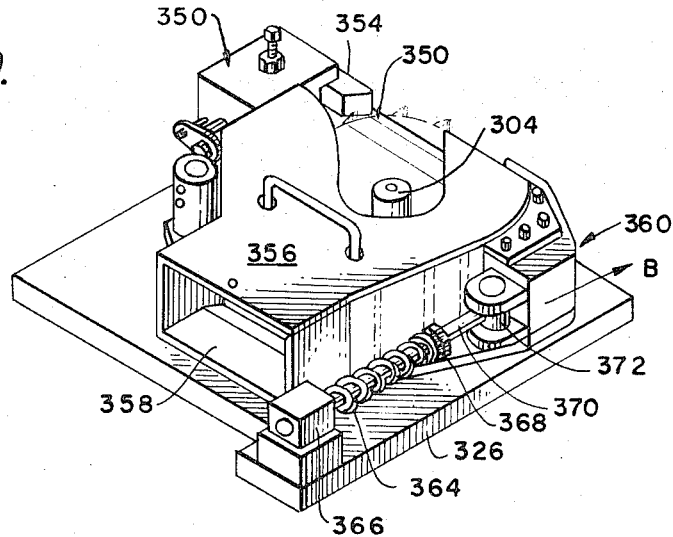
Figure 20:
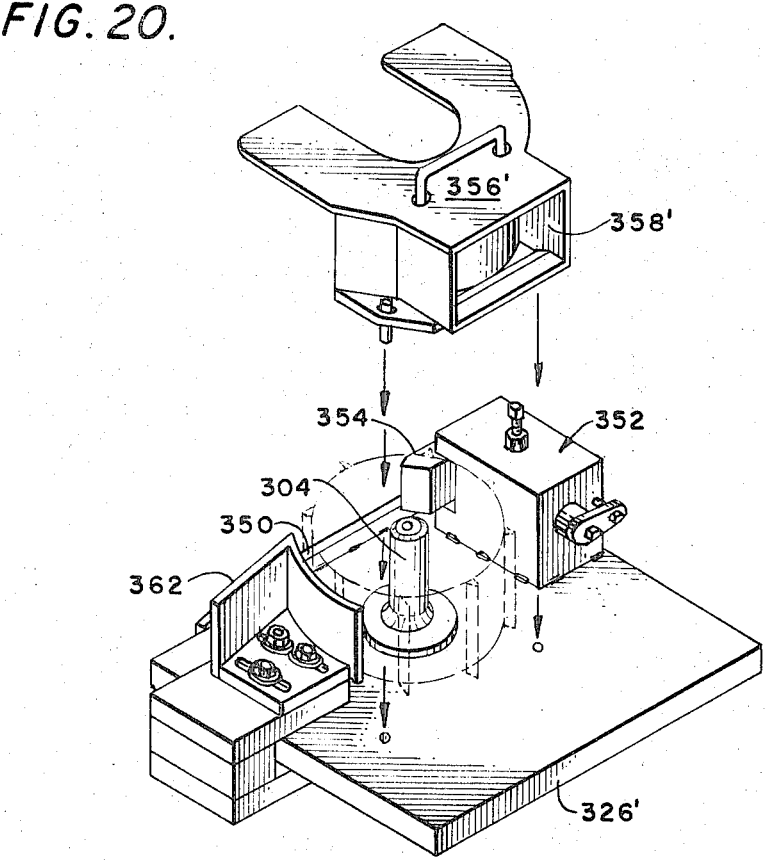

FIGS. 11, 12 and 13 are fragmentary sections substantially on lines 11—11, 12—12 and 13—13 of FIG. 7;

FIG. 14 is a section on line 14—14 of FIG. 3;

FIG. 15 is a side elevational view of the structure shown in FIG. 14;

FIG. 16 is a section on line 16—16 of FIG. 3;

FIG. 17 is a section on line 17—17 of FIG. 16;

FIG. 18 is a fragmentary perspective view of the support means for the cutters and cutter motors;

FIG. 19 is an enlarged perspective view of one of the cutter heads, chip removal chutes and cutter fences;

FIG. 20 is an exploded view of the other cutter structure;

FIG. 21 is a section on line 21—21 of FIG. 3;

FIG. 22 is a section on line 22—22 of FIG. 21;

FIG. 23 is an enlarged fragmentary partial sectional view of the drive means for the cutter, output roller, and the feed chain; and FIG. 24 is a perspective view of the cam element at the head end of the conveyor run.

THE MACHINE

Figure 1:
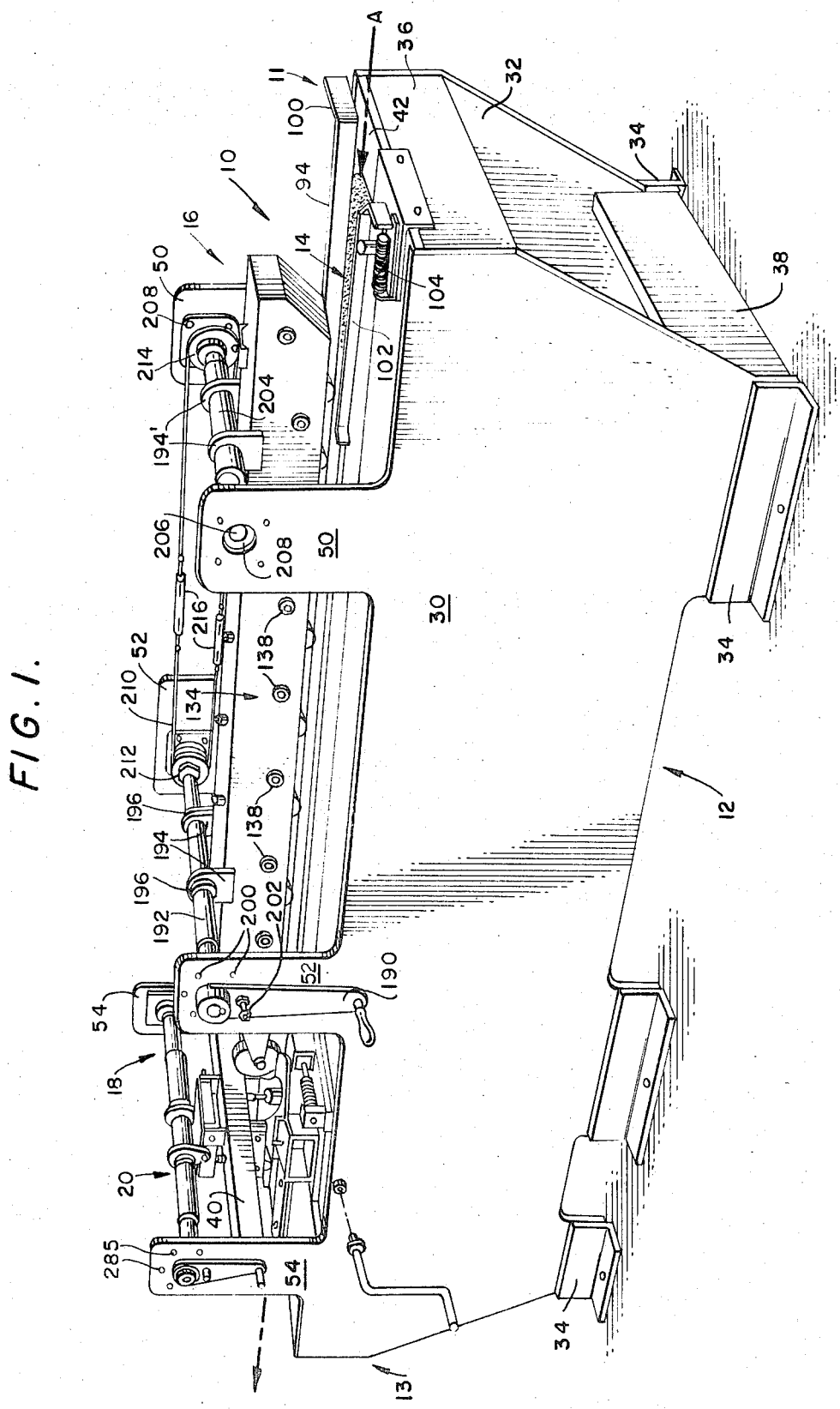
FIG. 1 is a perspective view of a planing machine incorporating the advantages of the present invention.
Figure 2:
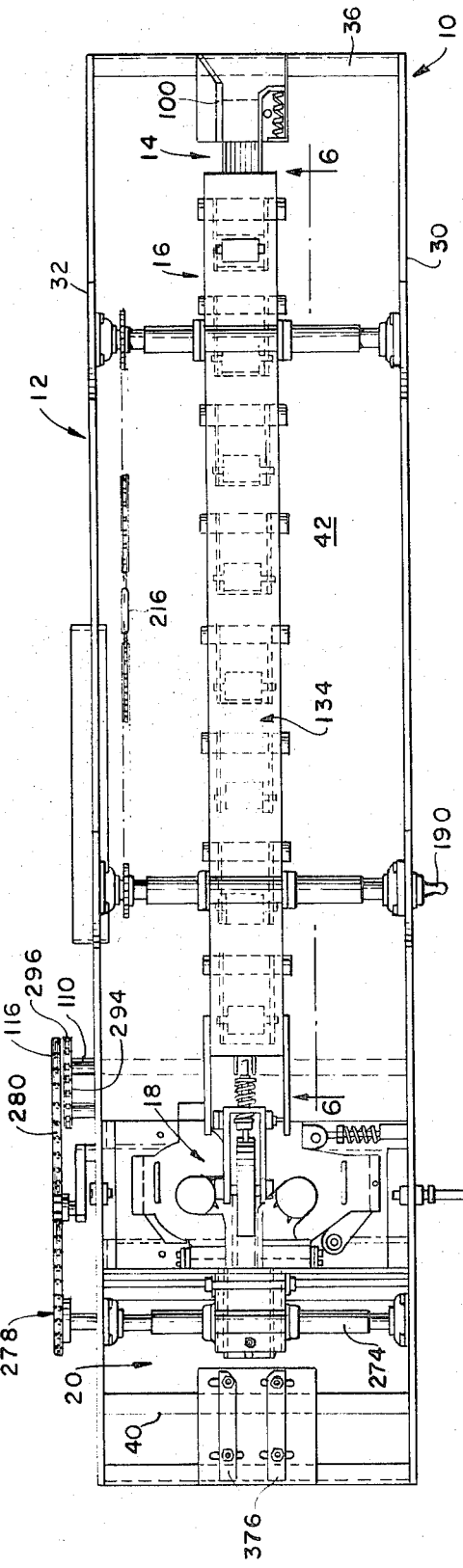
FIG. 2 is a top plan view of the apparatus shown in FIG. 1.

Referring particularly to FIGS. 1, 2 and 3, the planing machine generally designated 10 includes a main frame 12, lumber conveyor means 14, lumber hold-down means 16, dual planers 18, lumber output means 20, and drive-means for the lumber conveyor and output rolls 22, more clearly shown in FIG. 23.

MAIN FRAME

The main frame 12 will be more particularly described in reference to FIGS. 1 through 5, 11, 12 and 13. The main frame includes a pair of primary side frame members 30 and 32, the lower ends of which have angle brackets 34 welded thereto which brackets may be bored to receive conventional anchor bolts for the entire assembly. The side frames 30 and 32 are maintained in spaced relationship by a plurality of upper and lower cross members 36 and 38 and transverse support bars such as bar 40. The frame also includes a top bed generally designated 42 which has a planar upper surface 44 and a pair of depending legs 46 and 48 which are secured to their respective side members 30 and 32 by welding, for example.

In the illustrated embodiment of the invention wherein the planer is primarily designed for planing stock 1-½ inches × 4-½ inches × 8 feet in length into finished studs 1-½ inches × 3-½ inches × 8 feet, the side frames are about 13 feet long, 3 feet high to the top bed 42 and said frames are spaced about 3 feet. Further, as more clearly illustrated in FIGS. 1 and 3, the side frames 30 and 32 are provided with integral upwardly projecting standards 50, 52 and 54, the purposes of which will become more apparent hereinafter.

Referring again particularly to FIGS. 1 through 2, and 16, unplaned lumber designated A is fed into the machine 10 at its input end 11 and is carried by the endless belt 14 below the pressure rolls 16 and between the pair of cutters generally designated 18, thence between the output roll assembly 20 at end 13 of the machine.

THE CARRIER CHAIN 14

One of the more important sub-assemblies of the planing machine 10 is the carrier chain for the stock lumber to be planed which will be described in detail in reference particularly to FIGS. 3, 6 through 13, and 23. The chain 14 for the illustrated machine is made up of 62 identical links 60 formed of machined steel. Each link 60 has a central tongue portion 62 at its leading edge and cooperating bifurcated elements 64 at the rearward or trailing end into which the leading tongue of the trailing link is received. The tongue 62 and the bifurcated rearward end 64 are bored as at 66 and 68, respectively, to receive coupling pins 70 which hold the links into an endless chain arrangement. The upper surface 72 of each link is milled transversely and longitudinally to form transverse grooves 74 and longitudinal grooves 76 and the grooves are generally V-shaped in transverse section, as more clearly shown in FIGS. 9 and 10 with the spacing between the grooves such that the upper planar surface of each of the links 60 is formed with a plurality of upstanding points 78, as more clearly shown in FIG. 8, in a diamond array. The points provide a rough or matted surface to ensure good traction between the upper surface of the endless chain 14 and the under surface of the stock lumber to be planed.

The under surface of each link is also milled with longitudinal ribbing 80, as shown in FIG. 10, of a size and configuration corresponding to longitudinal milling or ribbing 76 in its upper surface. The undersurface ribbing 80 matches cooperating ribbing 82, longitudinally milled in ways or tables 84 which are rigidly secured to the top surface 44 of the bed 42 of the main frame 12 of the machine as more clearly shown in FIGS. 11, 12, and 13. It will be seen particularly in FIG. 10 that with the links 60 of the endless chain 14 in contact with the ways 84 and their cooperating milled grooves, the chain and its links are rigidly held against movement transversely of the longitudinal movement of the chain thereby preventing lateral movement or squiggle in the stock lumber when the stock lumber is pressed into engagement with the endless carrier chain. In the illustrated form of the invention the ways 84 are secured by bolting to the bed 42 by a plurality of bolts and cap screws 86 and 88, respectively.

It will also be particularly noted in respect to FIGS. 11, 12 and 13 that the ways 84 are provided with edge curbing as illustrated at 90 in FIG. 11, and 92 in FIG. 12, intermittently therealong to assist in maintaining rectilinear travel of the chain. Further, marginal guidance along the left-hand side of the machine for the stock lumber to be planed is provided by a fence generally designated 94 which in the illustrated form of the invention comprises an L-shaped bracket secured to the bed 42 by suitable bolts 96 and spacer means 98.

It will be particularly noted from FIG. 7 that the fence 94 at the input end of the machine has an outwardly flared section 100 to assist in receiving lumber and that, as shown in FIG. 1, opposite the input end of fence 94 is a left-hand fence generally designated 102 which is spring-urged by spring means 104 to urge the lumber towards the fence 94; however, this spring guide or fence 102 does not employ sufficient force to force any of the crook from the lumber to be planed.

Other fences and guides are provided adjacent the pair of cutters which fences and guides will be described in detail hereinafter.

The endless chain 14 is driven by a single-drive pulley or sprocket located adjacent the head stocks or cutters 18.

In FIG. 6 the sprocket is designated 108 and rotates on a transverse shaft 110 mounted in bearings 114. The shaft 110 is driven by a sprocket 116 positioned outward of the side frame 32 as to be more fully described hereinafter. At the input end 11 of the machine the conveyor chain 14 passes about a cam-like curve stationary support element 120 which eases the returning chain onto the ways 84 carried by the bed 42. Further, in order to ensure smooth operation, felt wipers such as illustrated at 122, FIG. 6, are employed to lubricate the under surfaces of the links 60 as they pass thereby. The wipers may be attached to a small reservoir from which oil is taken up by wicking action as needed, as well known in the art, or forced lubrication of the wipers may be employed as desired.

HOLD-DOWN ROLLER ASSEMBLY

The hold-down roller assembly 16 will be described in reference to FIGS. 1 through 5, 14 and 15. The hold-down roller assembly generally designated 16 is composed of a bank of 8 separate hold-down rolls each designated 130 and a hold-down roll which functions between the pair of planers and generally designated 132. While each of the roll assemblies 130 and 132 is independently adjustable and independently movable, all of said rolls are also adjustable as a unit and to this end each of the roll assemblies 130 and 132 is carried in a generally U-shaped housing or box frame generally designated 134 which lies across the upper run of the conveyor chain. The U-shaped or box frame 134 receives a plurality of roller frames 136 with the frames being pivoted on shafts 138 secured between the side walls of the U or box frame 134. The forward portion of each of the frames 136 rotatably supports its hold down roll 142 on axle 144 for independent rotative movement. The force employed in urging the rolls 142 onto the upper surface of the lumber A, to be planed, is determined by independent hold-down springs 150 of the helical type which are received on shafts 152, the lower ends of which are pin-connected as at 154 to upstanding ears 156 welded to the upper surface 158 of the individual roll supporting housings 136 as more clearly shown in FIG. 15. The helical springs 150 bear at their upper ends against the inner surface 160 of the U channel or box member 134 and at the lower end against tension adjusting nuts 162. By means of the nuts 162 the downward thrust of the rollers on the lumber to be planed may be readily adjusted. Preferably at the input end the rollers have the least tension with the tension increasing as the lumber approaches the cutter heads.

At the forward end of the box frame 134 a pair of wings 166 mount a shaft 168 which rotatably mounts a U-shape frame generally designated 169 composed of side legs 170 and back leg 172. At the forward end of the arms 170 is rotatably mounted a hold-down or pressure wheel 174 on a shaft 176. The pivotal motion of the frame 169 is limited by a pair of helical springs 178 and 180, each of which is mounted on a shaft 182, the right hand end of which is journalled on a pin 184 mounted between a pair of ears 186 secured to the forward face 188 of the box frame 134. The springs 178 and 180 are mounted such that one bears against one face of rear plate 172 while the other bears against the other face with the springs being tensioned and maintained in operative positions by locking and control nuts 188 for spring 178 and 190 for spring 180. The amount of pressure applied by the roll 176 to the lumber A, as it is passing in the immediate zone of the cutters, is determined by the relative positions of the tensioning lock nuts 188 and 190.

The width W, FIG. 14, of the hold-down roll 174 is such that it only engages the center portion of the lumber A, as more clearly shown in FIG. 16, thereby preventing engagement of the wheel with the cutter blades to be more fully described hereinafter.

As hereinbefore described, while each of the plural rollers 142 is individually tensionable the entire U-shaped frame or housing 134 may be raised and lowered to provide for quick release of the rollers in the event of lumber jamming or to accommodate for different thicknesses of lumber within about a 2-inch range of adjustment. Raising or lowering of the frame 134 is carried out by a single crank 190 secured to the outboard end of a shaft 192 journalled between the pair of upstanding frame elements 52. The shaft rotatably supports the head end of the frame 134 via ears or tabs 194 journalled to the shaft at 196. The ends of the shaft are eccentrically mounted in the frame members 52 such that when the crank 190 is rotated the ears or tabs 194 are raised or lowered carrying therewith the housing 134 as more clearly illustrated in FIGS. 1 and 15.

The left-hand frame element 52 is provided with a plurality of bores 200 which are adapted to receive a stop-pin 202 secured to the crank arm 190. By pulling the pin 202 outwardly from one of the bores 200, the crank may be rotated to position by the pin 202 in another of the bores.

The feed end of the frame 134 is supported on a shaft 204 corresponding to shaft 192 via ears or tabs 194'. The shaft 204 is also provided with eccentric outer ends 206 which are journalled in bearing blocks 208 mounted to the inner faces of upstanding frame members 50. Shaft 204 is not provided with a crank such as crank 190. Shaft 204 is rotated by a flexible cable or chain 210 which cable is trained about a sheave or pulley 212 keyed to shaft 192 and a corresponding pulley or sheave 214 similarly keyed to shaft 204. The cable 210 includes a pair of turnbuckle means 216 in its run whereby the cable may be properly tensioned. With this arrangement it will be seen that as crank 190 is rotated, rotating shaft 192 and its attached pulley 212, shaft 204 via its pulley 214 and cable 210 are similarly and simultaneously rotated uniformly lifting and lowering the frame 134.

As hereinbefore discussed, following the cutters driven pressure roll means are provided to ensure removal of the planed lumber from the machine. The driven output roll of the machine will be described in reference to FIGS. 21 and 22 in conjunction with FIGS. 2 and 3 and FIGS. 23 wherein it will be noted, particularly from FIGS. 21 and 22, that the last in a series of hold-down rollers, roll 242, is positioned directly over a driven feed roll 270 secured to shaft 272 mounted in bearings 274. The outboard end 276 of shaft 272 has secured thereto a sprocket 278 which sprocket has trained thereover drive chain 280 which is driven from shaft 110 carrying the sprocket 116 for the feed chain 16, as more clearly shown in FIG. 23, with the chain 280 passing about sprocket 116 and upper and lower idler rolls 284 and 286. The chain 280 and its associated shafts 110 and 272 are in turn driven by a motor 286' via a gearhead 288 and output shaft 290 having keyed thereto sprocket 292 about which chain 294 is trained. The chain 294 engages the further sprocket 296 keyed to shaft 110 whereby the driven feed chain and the output roller are driven from a common motor.

The roll 242 is mounted on the forward end of pivot frame 236 and the roll is tensioned by a helical spring 250 which is supported on shaft 252 and the spring bears at one end against the inner surface of frame 260, at one end, and at the other against adjusting nuts 262.

The frame member 260 is pivotally mounted on a shaft 261 supported from the crossbar 263, in a similar manner to the pivotal mounting of the frame 236 to shaft 265 which is also supported by the crossbar 263. The frame 260 is also journalled to a pair of ears 267 via corss-shaft 269. The upper end of each of the ears 267 is journalled to cross-shaft 271, which cross-shaft has eccentric ends 273. One of the ends adjacent machine side frame 30 is journalled in a bearing 275 bolted to the inner face of the side frame. The other end passes through a bearing 277 and the extended end 279 receives a crank 281 similar to crank 190. The crank 281 is also provided with a locking pin or bolt 283 which is receivable in bores in the vertical member 54, as more clearly shown in FIG. 1 of the drawings.

CUTTER OR PLANER ASSEMBLY

In addition to the showing in FIGS. 1 and 2, the cutter assembly 18 will now be more particularly described in reference to FIGS. 16 through 20. As hereinbefore described, the planer is provided with a pair of planing or cutter heads 300 and 302 and each of said cutters is mounted to rotate on a vertical spindle 304 driven by separate drive motors 306–306' mounted in side-by-side fashion on adjustable frames, as more clearly shown in FIGS. 16, 17, and 18. Motor 306 is bolted to a vertical U-shaped channel member 308 while motor 306' is similarly bolted to a U-shaped channel member 308'. Channel member 308 is mounted between a pair of spaced L-channel members 310 and 312, one adjacent the feed end of the machine and the other 312 adjacent the discharge end of the machine. Each of the channels 310 and 312 is rigidly secured such as by bolting to the side plates 30 and 32 by bolts or cap-screws 314 passing through bores 316 in end caps 318 welded to their respective L-shaped channels 310 and 312. In order to reduce twisting torques in the assembly the upper end of the vertica-U-channels 308 and 308' are each provided with attached slide elements 320 and 320'. The outer walls or surfaces of these members have sliding engagement with the faces 322 of the L-channels 310 and 312. The upper surfaces 324 of each of the channels has sliding engagement with the pair of cutter plates or frames 326 and 326'. The wings or brackets 320 and the upper end of vertical U-shaped member 308 are welded to the under surface of plate 326 while the corresponding wings 320' and the top end of U-shaped member 308' are welded to the under surface of the plate 326'. The plate 326 and 326' are anchored to the top surfaces of L-shaped channels 310 and 312 by means of cap-screws which pass through slots 328 therein, as more clearly shown in FIG. 16, with the cap-screws being designated 330 and 330'. The top plates 326 and 326' have welded to their forward ends support runners 332 and 332' which form a bed for the under surface of the lumber in zone of the cutters.

Each of the carriages for the dual motors 306 and 306' also include means for shifting the motors and all of the mechanisms attached thereto to the limits of the slots 328, which means comprises lead nuts 340 and 340', which are bolted to the bridge members of each of the U-shaped vertical motor supports 308 and 308'. Each of the lead nuts 340 and 340' receives a lead screw 342 and 342'. The lead screws pass through tapped bores in their respective side frames 30 and 32 with the head portions 344 and 344' extending outwardly from the frame members. The cap heads 344 and 344' receive a removable crank 346, FIG. 16 of the drawings, whereby when the cap-screws 330 and 330' are loosened, the cutters may be adjusted for the proper depth of plane.

Now referring particularly to FIGS. 19 and 20, the tops of plates 326, shown in FIG. 19, and 326', shown in FIG. 20, have bolted thereto guides, chip removal means and guards for the rotating cutters.

The left-side head plate 326 and the right side head plate 236' for the cutters are provided with a fixed fence 350 which moves with the top plates and the cutters and adjust for the depth of cut. Further, the right and left hand cutters are provided with small adjustable guides generally designated 352 with the lumber contacting member 354 thereof being positioned beyond the radius of the cutter head. These adjustable guides 354 are adjusted to the finished lumber size and assist in assuring straight planing of the stock lumber. Further, each of the frames or tables 326 and 326' is provided with a cutter guard and chip removal member designated 356 and 356', respectively. It will be noted that the outlet ports 358 and 358' direct chips removed by the cutters toward the left and right hand sides of the machine away from the moving mechanisms and the lumber being planed as more clearly shown by the directional arrows in FIG. 16 of the drawings.

In FIG. 19, it will be noted that frame 326, for the left hand cutter, is provided with a spring tension chip breaker generally designated 360. The chip breaker 360 is mounted ahead of the cutter 300 and primarily serves as a means for holding the lumber up against the fixed guide 362 adjustably but rigidly mounted on frame or plate 326'. The amount of force pressing the spring tension chip breaker 360 in the direction of directional arrow B, FIG. 19, is determined by helical spring 364 which bears at one end against a fixed block 366 and at the other end against a pair of adjustable tension nuts 368 carried by rod 370 having its chip breaker end connected to the chip breaker via ears 372.

After the lumber passes the cutter heads and the outfeed roll assembly 20, the finished lumber comes in contact with a pair of short steel guides or fences designated 376, as more clearly shown in FIG. 2 of the drawings, thereafter the lumber discharges from the machine either onto a double-face planer or for storage or the like.

From the foregoing description it will be seen that the machine fully accomplishes all of the aims and objects hereinbefore set forth. It will also be recognized by those skilled in the art that various modifications may be made in the machine without departing from the scope of the attendant claims.

I claim:

1. Stock lumber edge planing apparatus comprising:
a bed having an input end and an output end;
a pair of vertical spindle laterally spaced cutters;
means for mounting said cutters for movement toward and away from each other adjacent the output end of the bed;
stock lumber conveying means for moving lumber from the input end to the cutters;
said conveying means including an endless chain composed of a plurality of generally planar links;
each of said links having a top lumber gripping surface and a lower surface with longitudinal grooves formed therein;
a table mounted on said bed from the input end to the cutters;
said table having longitudinal grooves formed therein to mate with the longitudinal grooves in each of said links;
and means for applying a downward pressure against the lumber stock progressively increasing from the input end to the cutters.

2. The invention defined in claim 1 wherein said means for applying downward pressure against the lumber comprises a plurality of lumber contacting rollers, each of which is pivotally mounted above the table and spring urged in a downward direction.

3. The invention defined in claim 2 wherein each of said spring urged rolls is carried by a common frame positioned above the table of the planing apparatus.

4. The invention defined in claim 3 wherein said common frame is mounted for limited vertical movement whereby the position of said rolls above the stock lumber may be adjusted in unison.

5. The invention defined in claim 1 including a further pressure roll mounted above the bed on the output side of said cutters.

6. The invention defined in claim 5 wherein drive means are provided for the output roll.

7. The invention defined in claim 6 wherein the drive means for said output roll is connected to the conveyor means whereby the conveyor means and the output roll are driven at the same effective speed.

8. The invention defined in claim 5 including adjustable spring means for urging the output roll into contact with the planed lumber.

9. The invention defined in claim 8 including further means for moving said output roll in a vertical direction independent of said spring means.

10. Stock lumber edge planning apparatus comprising:
a bed having an input end and an output end;
a pair of vertical spindle laterally spaced cutters;
means for mounting said cutters for movement toward and away from each other adjacent the output end of the bed;
stock lumber conveying means for moving lumber from the input end to the cutters;
said conveying means including an endless chain composed of a plurality of generally planar links;
each of said links having a top lumber gripping surface and a lower surface with longitudinal grooves formed therein;
a table mounted on said bed from the input end to the cutters;

said table having longitudinal grooves formed therein to mate with the longitudinal grooves in each of said links;

means for applying a downward pressure against the lumber stock progressively increasing from the input end to the cutters; and including cam-shaped means for aligning the conveyor chain links to assist in aligning the grooves therein with the longitudinal grooves in the table.

11. The invention defined in claim 1 including a rigid fence extending from the input end of the bed to the cutters along one longitudinal edge of the bed.

12. The invention defined in claim 4 wherein the means for moving the frame for the pressure rolls includes a pair of longitudinally spaced eccentrically mounted shafts and mounting means between each of said shafts and said frame.

13. The invention defined in claim 12 wherein means are provided for selectively rotating one of said eccentrically mounted shafts and further means connecting said one of said eccentrically mounted shafts to the other of said shafts for simultaneous movement thereof.

* * * * *